US012686039B2

(12) United States Patent
Hung et al.

(10) Patent No.: US 12,686,039 B2
(45) Date of Patent: Jul. 21, 2026

(54) TEST BASE CLEANING LINE AND METHOD THEREOF

(71) Applicant: SILICONWARE PRECISION INDUSTRIES CO., LTD., Taichung City (TW)

(72) Inventors: Hsiang-Yun Hung, Taichung City (TW); Yi-Ren Chen, Taichung City (TW); Chun-Yu Hsieh, Taichung City (TW); Ping-Lin Chang, Taichung City (TW)

(73) Assignee: SILICONWARE PRECISION INDUSTRIES CO., LTD., Taichung City (TW)

( * ) Notice: Subject to any disclaimer, the term of this patent is extended or adjusted under 35 U.S.C. 154(b) by 75 days.

(21) Appl. No.: 18/948,708

(22) Filed: Nov. 15, 2024

(65) Prior Publication Data

US 2026/0070097 A1 Mar. 12, 2026

(30) Foreign Application Priority Data

Jul. 10, 2024 (TW) ................................ 113125855

(51) Int. Cl.
*B08B 7/04* (2006.01)
*B08B 3/08* (2006.01)
*B08B 5/02* (2006.01)
*B08B 7/00* (2006.01)

(52) U.S. Cl.
CPC .................. *B08B 7/04* (2013.01); *B08B 3/08* (2013.01); *B08B 5/02* (2013.01); *B08B 7/0042* (2013.01)

(58) Field of Classification Search
CPC .... B08B 7/04; B08B 3/08; B08B 5/02; B08B 7/0042
See application file for complete search history.

(56) References Cited

U.S. PATENT DOCUMENTS

| | | | | |
|---|---|---|---|---|
| 2007/0028946 | A1* | 2/2007 | Vogtmann .......... | G01R 31/2887 15/21.1 |
| 2016/0069931 | A1* | 3/2016 | Olivier ................... | G08B 21/24 340/514 |
| 2020/0200798 | A1* | 6/2020 | Pareja ................ | G01R 1/06733 |
| 2020/0256892 | A1* | 8/2020 | Bruner ............... | G01R 1/06738 |
| 2020/0286728 | A1* | 9/2020 | Nakayama ......... | G01R 31/2601 |
| 2023/0417797 | A1* | 12/2023 | Hayashi ............. | G01R 1/06711 |

FOREIGN PATENT DOCUMENTS

| | | |
|---|---|---|
| CN | 101611324 | * 11/2012 |
| CN | 117483274 | * 2/2024 |
| CN | 117548431 | * 2/2024 |
| CN | 118558659 | * 8/2024 |
| JP | 2004-117054 | * 4/2004 |
| JP | 2004-170265 | * 6/2004 |
| WO | WO 2007/016599 | * 2/2007 |

* cited by examiner

*Primary Examiner* — Alexander Markoff
(74) *Attorney, Agent, or Firm* — Dority & Manning, PA

(57) ABSTRACT

A test base cleaning line and a method thereof are provided. The test base cleaning line includes a plurality of cleaning mechanisms, a scanning device, and a moving device. The scanning device is configured for scanning a barcode on a test base to identify a type of the test base, and the moving device is configured for moving the test base to any one of the plurality of cleaning mechanisms according to the type of the test base so that the cleaning mechanism can perform a cleaning operation to the test base.

17 Claims, 4 Drawing Sheets

TEST BASE CLEANING LINE AND METHOD THEREOF

CROSS-REFERENCE TO RELATED APPLICATIONS

The present application is based upon and claims the right of priority to TW Patent Application No. 113125855, filed Jul. 10, 2024, the disclosure of which is hereby incorporated by reference herein in its entirety for all purposes

BACKGROUND

1. Technical Field

The present disclosure relates to a cleaning line and a method thereof, and more particularly, to a fully automated test base cleaning line and a method thereof.

2. Description of Related Art

In recent years, with the continuous maturity and development of semiconductor process technology, various high-performance electronic products are constantly introduced, and the functions of electronic products are developing towards user-friendliness and multi-functionality, and there are integrated circuit (IC) components with various functions and different packaging forms inside electronic products. However, regardless of the packaging form, the integrated circuit components are mounted on the relevant carrier (lead frame or L/F, organic core substrate, coreless substrate, etc.), and must undergo the electrical test of the package structure before leaving the factory to ensure that the electrical function of the packaged product is normal.

In conventional electrical test equipment, the component under test is placed between an upper cover and a test base, and the upper cover, the test base and the component under test are closely engaged via pneumatic bonding, and the probe of the upper cover is electrically connected to the electrical contact on the upper side of the component under test, and the probe of the test base is electrically connected to the electrical contact on the lower side of the component under test. After long-term use of the test base, dirt will remain on the test base due to the test base being in contact with and extruded with the component under test, and the dirt will cause test errors or failure to test and cause risk of damaging the component under test. Therefore, in the semiconductor industry, cleaning operation will be regularly performed to the test base after the test base is used for a period of time so as to avoid the aforementioned problems.

However, due to testing different package structures, the test bases have different forms and their cleaning methods will also be different. After the test base is removed from the electrical test equipment, it is necessary to manually judge the type of test base to decide which cleaning process to go. After entering the cleaning process, a person needs to control and operate the machine at each station to conduct every cleaning step. Therefore, the cleaning operation causes a considerable waste of manpower, and manual judgement of the test type often leads to misjudgment and the wrong cleaning process due to various reasons (such as staff fatigue, etc.).

Therefore, how to overcome the problems of the abovementioned prior art has become an urgent problem to be solved at present.

SUMMARY

The present disclosure provides a test base cleaning line, which comprises: a plurality of cleaning mechanisms; a scanning device configured for scanning a barcode on a test base to identify a type of the test base; and a moving device configured for moving the test base to any one of the plurality of cleaning mechanisms according to the type of the test base so that the cleaning mechanism performs a cleaning operation on the test base.

In the aforementioned test base cleaning line, the cleaning mechanism comprises an image capturing device, a laser device, and a plurality of storage compartments, wherein the image capturing device is used for capturing an image of the test base, the image is used for confirming a mounting position of a clamp and for confirming a cleaning result, the laser device is used for cleaning the test base, and the plurality of storage compartments are used for storing the cleaned test base.

In the aforementioned test base cleaning line, the moving device further mounts the clamp on the test base according to the image and moves the test base under the laser device, wherein the clamp is removed after the laser device is done cleaning, and the test base is moved to the plurality of storage compartments after the cleaning result is confirmed.

In the aforementioned test base cleaning line, the cleaning mechanism comprises a plurality of cleaning tanks, a high-pressure gas tank, an oven, an image capturing device, and a plurality of storage compartments, wherein the plurality of cleaning tanks are respectively provided with a chemical agent, an alkaline agent, a neutralizing agent, pure water, or alcohol for soaking the test base, the high-pressure gas tank is used for blowing gas to the test base, the oven is used for drying the test base, the image capturing device is used for capturing an image of the test base, the image is used for confirming a cleaning result, and the plurality of storage compartments are used for storing the cleaned test base.

In the aforementioned test base cleaning line, the moving device is further used to first fix the test base on a carrier plate, sequentially put the test base into the plurality of cleaning tanks for cleaning, then put the test base into the high-pressure gas tank for blowing, put the test base into the oven for drying, detach the test base from the carrier plate, and move the test base to the plurality of storage compartments after the cleaning result is confirmed.

In the aforementioned test base cleaning line, the cleaning mechanism comprises an image capturing device, a high-pressure gas tank, and a plurality of storage compartments, wherein the image capturing device is used for capturing an image of the test base, the image is used for confirming a cleaning position of the test base and for confirming a cleaning result, the high-pressure gas tank is used for blowing gas to the test base, and the plurality of storage compartments are used for storing the cleaned test base.

In the aforementioned test base cleaning line, the moving device further cleans the test base with alcohol according to the image, then puts the test base into the high-pressure gas tank for blowing, and moves the test base to the plurality of storage compartments after the cleaning result is confirmed.

In the aforementioned test base cleaning line, the moving device is a robotic arm.

The present disclosure further provides a method for cleaning a test base, the method comprises: scanning, by a scanning device, a barcode on the test base to identify a type of the test base; and moving, by a moving device, the test base to any one of a plurality of cleaning mechanisms according to the type of the test base so that the cleaning mechanism performs a cleaning operation on the test base.

In the aforementioned method, the cleaning operation performed by the cleaning mechanism on the test base comprises: moving, by the moving device, the test base under a laser device; and cleaning the test base by the laser device.

In the aforementioned method, the cleaning operation performed by the cleaning mechanism on the test base further comprises: capturing, by an image capturing device, an image of the test base to confirm a mounting position of a clamp from the image; mounting, by the moving device, the clamp on the test base according to the image; moving, by the moving device, the test base under the laser device; and removing the clamp by the moving device after the laser device is done cleaning.

In the aforementioned method, the cleaning operation performed by the cleaning mechanism on the test base further comprises: capturing, by the image capturing device, another image of the test base to confirm a cleaning result from the another image; and moving, by the moving device, the test base to any one of a plurality of storage compartments.

In the aforementioned method, the cleaning operation performed by the cleaning mechanism on the test base comprises: sequentially putting, by the moving device, the test base into a plurality of cleaning tanks for cleaning, wherein the plurality of cleaning tanks are respectively provided with a chemical agent, an alkaline agent, a neutralizing agent, pure water, or alcohol for soaking the test base; putting, by the moving device, the test base into a high-pressure gas tank for blowing; and putting, by the moving device, the test base into an oven for drying.

In the aforementioned method, the cleaning operation performed by the cleaning mechanism on the test base further comprises: fixing, by the moving device, the test base on a carrier plate; sequentially putting, by the moving device, the test base into the plurality of cleaning tanks for cleaning; and detaching, by the moving device, the test base from the carrier plate after the test base is dried in the oven.

In the aforementioned method, the cleaning operation performed by the cleaning mechanism on the test base further comprises: capturing, by an image capturing device, an image of the test base to confirm a cleaning result from the image after the test base is detached from the carrier plate; and moving, by the moving device, the test base to any one of a plurality of storage compartments.

In the aforementioned method, the cleaning operation performed by the cleaning mechanism on the test base comprises: capturing, by an image capturing device, an image of the test base to confirm a cleaning position of the test base from the image; cleaning the test base with alcohol by the moving device according to the image; putting, by the moving device, the test base into a high-pressure gas tank for blowing; capturing, by the image capturing device, another image of the test base to confirm a cleaning result from the another image; and moving, by the moving device, the test base to any one of a plurality of storage compartments.

In the aforementioned method, the moving device is a robotic arm.

As mentioned above, the test base cleaning line and method thereof of the present disclosure can use a scanning device to automatically identify the cleaning method required for the test base, and use a robotic arm to replace manual labor to move the test base to different cleaning mechanisms to perform the required cleaning operations on the test base. In addition, the test base cleaning line and method thereof of the present disclosure also use an image capturing device to confirm the mounting position of a clamp, the cleaning position of the test base, and the cleaning result. The test base cleaning line and method thereof of the present disclosure can effectively and significantly reduce manpower and cleaning hours, and reduce the risk of the test base entering the wrong cleaning process.

DETAILED DESCRIPTION

The following describes the implementation of the present disclosure with examples. Those skilled in the art can easily understand other advantages and effects of the present disclosure from the contents disclosed in this specification.

It should be understood that, the structures, ratios, sizes, and the like in the accompanying figures are used for illustrative purposes to facilitate the perusal and comprehension of the contents disclosed in the present specification by one skilled in the art, rather than to limit the conditions for practicing the present disclosure. Any modification of the structures, alteration of the ratio relationships, or adjustment of the sizes without affecting the possible effects and achievable proposes should still be deemed as falling within the scope defined by the technical contents disclosed in the present specification. Meanwhile, terms such as "a," "one," "any one," "another," "plurality of," and the like are merely used for clear explanation rather than limiting the practicable scope of the present disclosure, and thus, alterations or adjustments of the relative relationships thereof without essentially altering the technical contents should still be considered in the practicable scope of the present disclosure.

Figure 1:
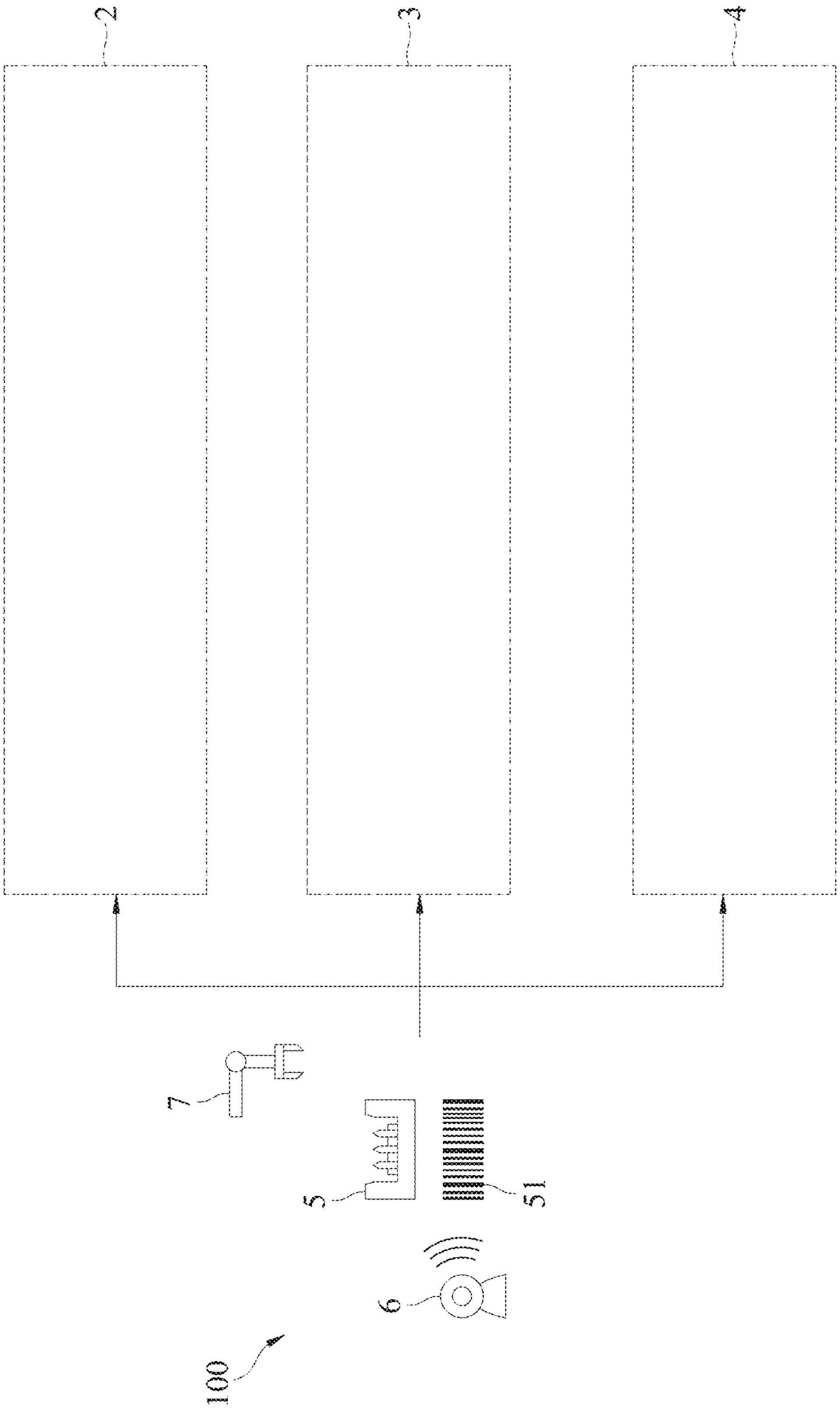
FIG. 1 is a schematic diagram illustrating the overall process of a test base cleaning line of the present disclosure.

FIG. 1 is a schematic diagram illustrating the overall process of a test base cleaning line 100 of the present disclosure. The test base cleaning line 100 of the present disclosure includes a plurality of cleaning mechanisms 2, 3, 4, a scanning device 6 and a moving device 7. The following describes the details of the test base cleaning line 100 of the present disclosure, and the same contents between the test base cleaning method and the test base cleaning line 100 of the present disclosure will not be repeated.

The scanning device 6 is used for scanning a barcode 51 on a test base 5 to identify the type of the test base 5 (the test base 5 may be in the form of, but not limited to, a socket). The moving device 7 can move the test base 5 to any of the cleaning mechanisms 2, 3, 4 according to the type of the test base 5, so that any one of the cleaning mechanisms 2, 3, 4 can perform a cleaning operation to the test base 5.

In one embodiment, the barcode 51 can be a one-dimensional barcode, a two-dimensional barcode, or a quick-response code (QR code); the scanning device 6 can be a barcode scanner, a barcode reader, or a camera; the moving device 7 can be a robotic arm; and the cleaning mechanisms 2, 3, 4 can be made of different devices to provide different cleaning methods (described in detail later), but the present disclosure is not limited to as such.

Figure 2:
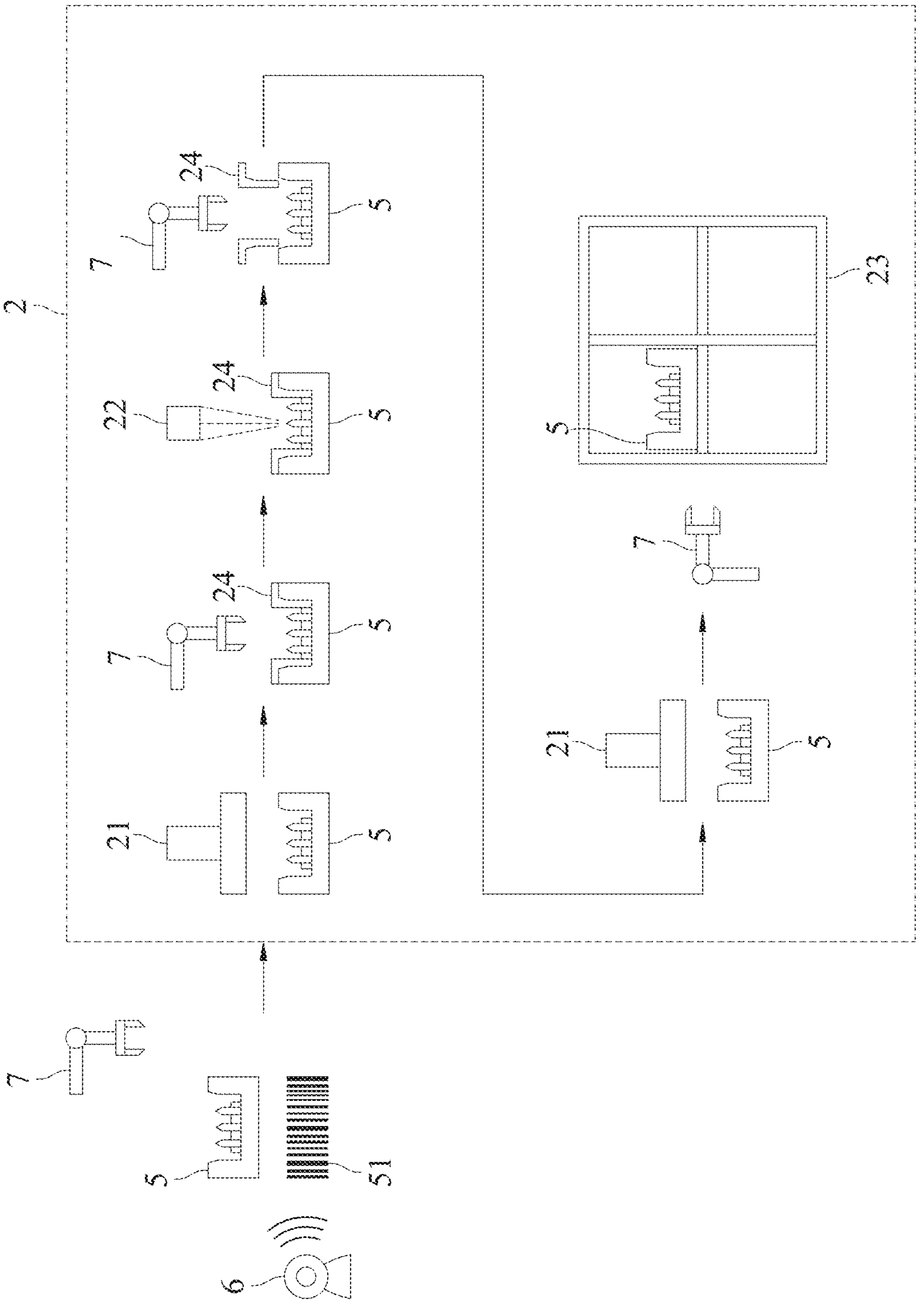
FIG. 2 to FIG. 4 are schematic diagrams illustrating the cleaning processes of different embodiments of the test base cleaning line of the present disclosure.

FIG. 2 is a schematic diagram illustrating the cleaning process of the test base cleaning line 100 of the present disclosure using the cleaning mechanism 2 as an embodiment.

In one embodiment, first an image capturing device 21 captures an image of the test base 5, and the image is used to confirm the mounting position of a clamp 24. Then, the moving device 7 can mount the clamp 24 on the test base 5 according to the image, and move the test base 5 under a laser device 22. Afterwards, the laser device 22 cleans the test base 5. After the test base 5 is cleaned, the moving device 7 removes the clamp 24, and the image capturing device 21 captures another image of the test base 5 at this time to confirm the cleaning result from the another image. After the cleaning result is confirmed, the moving device 7 can move the cleaned test base 5 to any one of storage compartments 23.

In one embodiment, the image capturing device 21 can be a video camera, a photo camera, or a hardware including a lens with an image capture function, but the present disclosure is not limited thereto.

Figure 3:
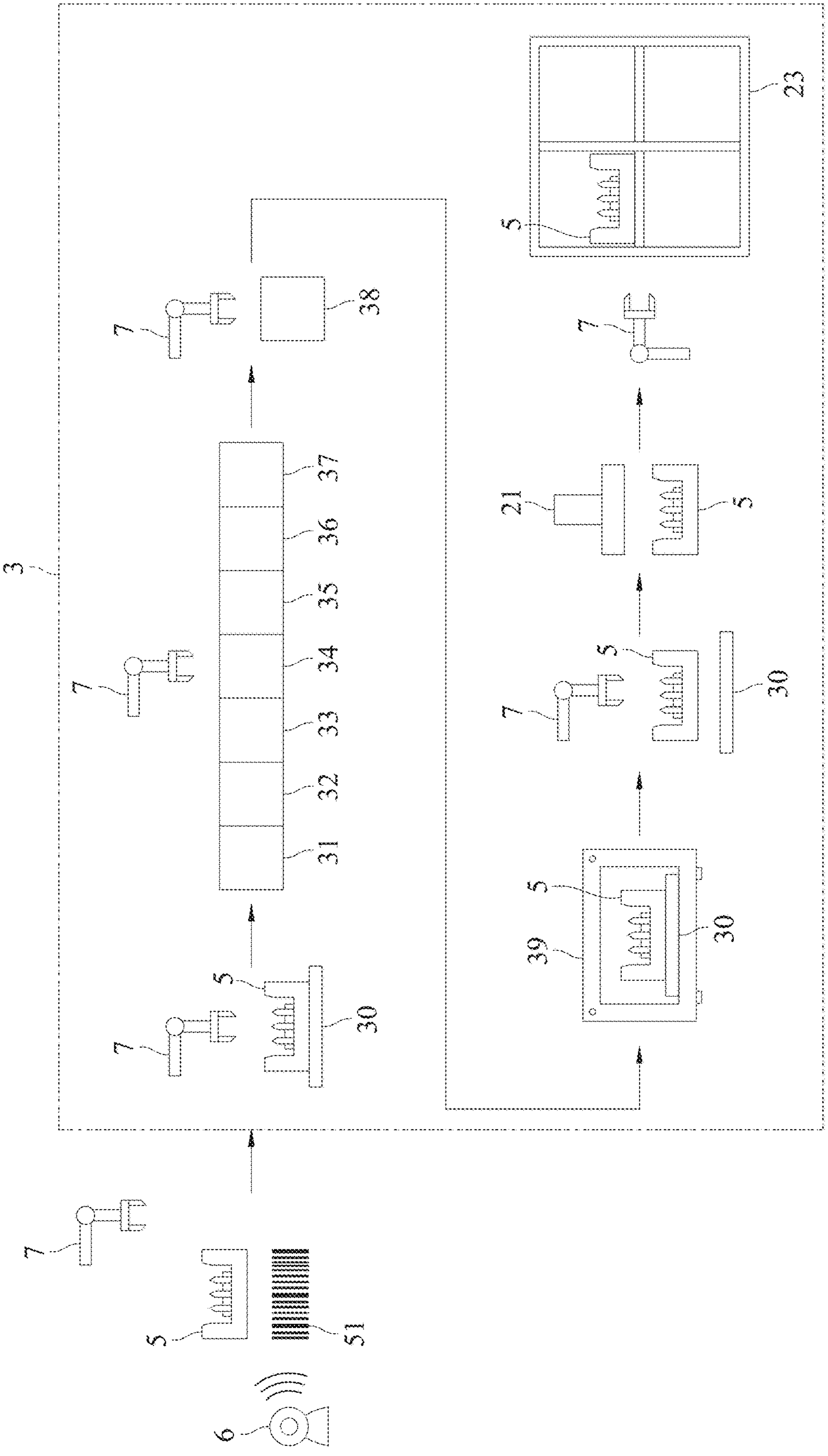

FIG. 3 is a schematic diagram illustrating the cleaning process of the test base cleaning line 100 of the present disclosure using the cleaning mechanism 3 as an embodiment.

In one embodiment, first the moving device 7 fixes the test base 5 on a carrier plate 30, then sequentially puts the test base 5 into a plurality of cleaning tanks 31, 32, 33, 34, 35, 36, 37 for cleaning.

In one embodiment, the cleaning tank 31 is provided with at least a chemical agent, the cleaning tank 32 is provided with at least an alkaline agent, the cleaning tank 33 is provided with at least a neutralizing agent, the cleaning tanks 34, 35, 36 are provided with pure water, and the cleaning tank 37 is provided with alcohol. The solutions in the cleaning tanks 31, 32, 33, 34, 35, 36, 37 can be changed according to requirements, and the order in which the test base 5 put into the cleaning tanks 31, 32, 33, 34, 35, 36, 37 can also be changed. In addition, the cleaning tanks 31, 32, 33, 34, 35, 36, 37 are used for soaking the test base 5, and can also clean the test base 5 with ultra-high frequency vibration.

Next, the moving device 7 puts the test base 5 into a high-pressure gas tank 38 for blowing (the gas in the high-pressure gas tank 38 may be, but not limited to, air), and then puts the test base 5 into an oven 39 for drying. After the test base 5 is dried in the oven 39, the moving device 7 can detach the test base 5 from the carrier plate 30. Finally, the image capturing device 21 captures an image of the test base 5 to confirm the cleaning result from the image. After the cleaning result is confirmed, the moving device 7 can move the cleaned test base 5 to any one of the storage compartments 23.

Figure 4:
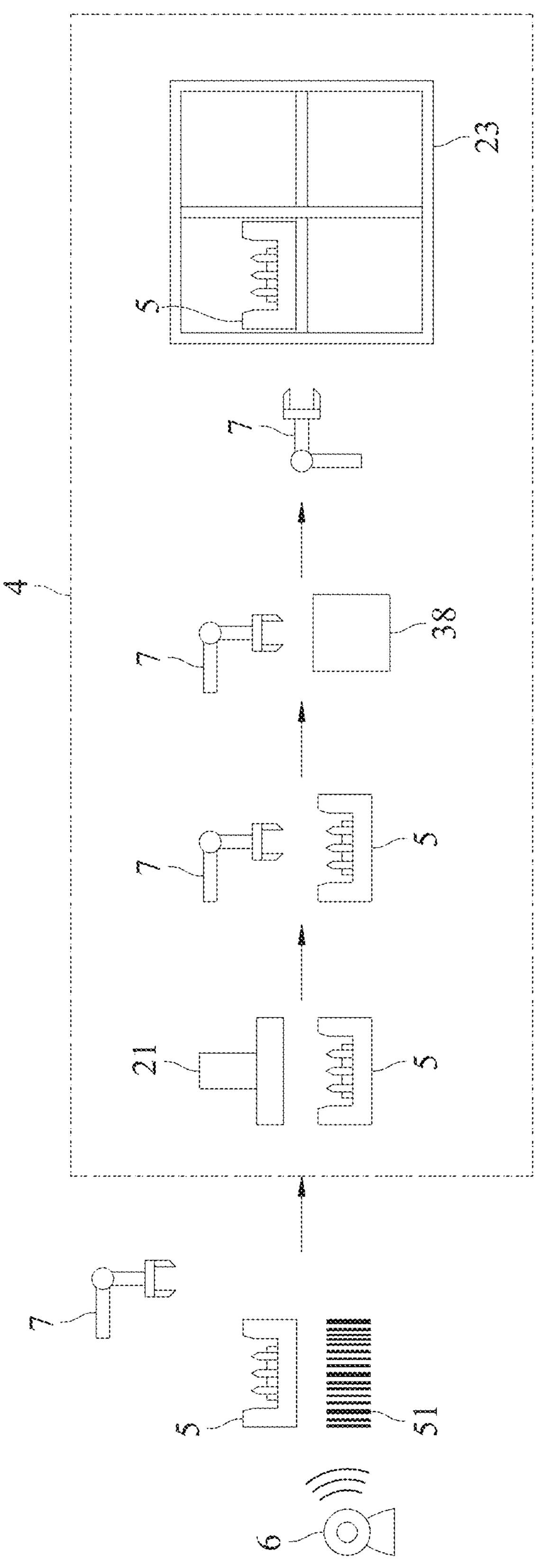

FIG. 4 is a schematic diagram illustrating the cleaning process of the test base cleaning line 100 of the present disclosure using the cleaning mechanism 4 as an embodiment.

In one embodiment, first the image capturing device 21 captures an image of the test base 5, and the image is used to confirm the cleaning position of the test base 5. Then, the moving device 7 can clean the test base 5 with alcohol according to the image. After completing cleaning, the moving device 7 puts the test base 5 into the high-pressure gas tank 38 for blowing. Finally, the image capturing device 21 captures another image of the test base 5 to confirm the cleaning result from the another image. After the cleaning result is confirmed, the moving device 7 can move the cleaned test base 5 to any one of the storage compartments 23.

The image captured by the image capturing device 21 can be stored in a back-end computer to collect data on the quality of the test base 5 or to use for big data research. Furthermore, the cleaning mechanisms 2, 3, 4 can be connected to a back-end computer, so that the back-end computer controls movements/operations of the image capturing device 21, the laser device 22, the cleaning tanks 31, 32, 33, 34, 35, 36, 37, the high-pressure gas tank 38, the oven 39, the scanning device 6 and the moving device 7 to achieve an automated process.

To sum up, the test base cleaning line and method thereof of the present disclosure can use a scanning device to automatically identify the cleaning method required for the test base, and use a robotic arm to replace manual labor to move the test base to different cleaning mechanisms to perform the required cleaning operations on the test base. In addition, the test base cleaning line and method thereof of the present disclosure also use an image capturing device to confirm the mounting position of a clamp, the cleaning position of the test base, and the cleaning result. The test base cleaning line and method thereof of the present disclosure can effectively and significantly reduce manpower and cleaning hours, and reduce the risk of the test base entering the wrong cleaning process.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. A test base cleaning line, comprising:

a plurality of cleaning mechanisms;

a scanning device configured for scanning a barcode on a test base to identify a type of the test base; and a moving device configured for moving the test base to any one of the plurality of cleaning mechanisms according to the type of the test base so that the cleaning mechanism performs a cleaning operation on the test base.

2. The test base cleaning line of claim 1, wherein the cleaning mechanism comprises an image capturing device, a laser device, and a plurality of storage compartments, wherein the image capturing device is used for capturing an image of the test base, the image is used for confirming a mounting position of a clamp and for confirming a cleaning result, the laser device is used for cleaning the test base, and the plurality of storage compartments are used for storing the cleaned test base.

3. The test base cleaning line of claim 2, wherein the moving device further mounts the clamp on the test base according to the image and moves the test base under the laser device, wherein the clamp is removed after the laser device is done cleaning, and the test base is moved to the plurality of storage compartments after the cleaning result is confirmed.

4. The test base cleaning line of claim 1, wherein the cleaning mechanism comprises a plurality of cleaning tanks, a high-pressure gas tank, an oven, an image capturing device, and a plurality of storage compartments, wherein the plurality of cleaning tanks are respectively provided with a chemical agent, an alkaline agent, a neutralizing agent, pure water, or alcohol for soaking the test base, the high-pressure gas tank is used for blowing gas to the test base, the oven is used for drying the test base, the image capturing device is used for capturing an image of the test base, the image is used for confirming a cleaning result, and the plurality of storage compartments are used for storing the cleaned test base.

5. The test base cleaning line of claim 4, wherein the moving device is further used to first fix the test base on a carrier plate, sequentially put the test base into the plurality of cleaning tanks for cleaning, then put the test base into the high-pressure gas tank for blowing, put the test base into the oven for drying, detach the test base from the carrier plate, and move the test base to the plurality of storage compartments after the cleaning result is confirmed.

6. The test base cleaning line of claim 1, wherein the cleaning mechanism comprises an image capturing device, a high-pressure gas tank, and a plurality of storage compartments, wherein the image capturing device is used for capturing an image of the test base, the image is used for confirming a cleaning position of the test base and for confirming a cleaning result, the high-pressure gas tank is used for blowing gas to the test base, and the plurality of storage compartments are used for storing the cleaned test base.

7. The test base cleaning line of claim 6, wherein the moving device further cleans the test base with alcohol according to the image, then puts the test base into the high-pressure gas tank for blowing, and moves the test base to the plurality of storage compartments after the cleaning result is confirmed.

8. The test base cleaning line of claim 1, wherein the moving device is a robotic arm.

9. A method for cleaning a test base, comprising:

scanning, by a scanning device, a barcode on the test base to identify a type of the test base; and moving, by a moving device, the test base to any one of a plurality of cleaning mechanisms according to the type of the test base so that the cleaning mechanism performs a cleaning operation on the test base.

10. The method of claim 9, wherein the cleaning operation performed by the cleaning mechanism on the test base comprises:

moving, by the moving device, the test base under a laser device; and cleaning the test base by the laser device.

11. The method of claim 10, wherein the cleaning operation performed by the cleaning mechanism on the test base further comprises:

capturing, by an image capturing device, an image of the test base to confirm a mounting position of a clamp from the image;

mounting, by the moving device, the clamp on the test base according to the image;

moving, by the moving device, the test base under the laser device; and removing the clamp by the moving device after the laser device is done cleaning.

12. The method of claim 11, wherein the cleaning operation performed by the cleaning mechanism on the test base further comprises:

capturing, by the image capturing device, another image of the test base to confirm a cleaning result from the another image; and moving, by the moving device, the test base to any one of a plurality of storage compartments.

13. The method of claim 9, wherein the cleaning operation performed by the cleaning mechanism on the test base comprises:

sequentially putting, by the moving device, the test base into a plurality of cleaning tanks for cleaning, wherein the plurality of cleaning tanks are respectively provided with a chemical agent, an alkaline agent, a neutralizing agent, pure water, or alcohol for soaking the test base;

putting, by the moving device, the test base into a high-pressure gas tank for blowing; and putting, by the moving device, the test base into an oven for drying.

14. The method of claim 13, wherein the cleaning operation performed by the cleaning mechanism on the test base further comprises:

fixing, by the moving device, the test base on a carrier plate;

sequentially putting, by the moving device, the test base into the plurality of cleaning tanks for cleaning; and detaching, by the moving device, the test base from the carrier plate after the test base is dried in the oven.

15. The method of claim 14, wherein the cleaning operation performed by the cleaning mechanism on the test base further comprises:

capturing, by an image capturing device, an image of the test base to confirm a cleaning result from the image after the test base is detached from the carrier plate; and moving, by the moving device, the test base to any one of a plurality of storage compartments.

16. The method of claim 9, wherein the cleaning operation performed by the cleaning mechanism on the test base comprises:

capturing, by an image capturing device, an image of the test base to confirm a cleaning position of the test base from the image;

cleaning the test base with alcohol by the moving device according to the image;

putting, by the moving device, the test base into a high-pressure gas tank for blowing;

capturing, by the image capturing device, another image of the test base to confirm a cleaning result from the another image; and moving, by the moving device, the test base to any one of a plurality of storage compartments.

17. The method of claim 9, wherein the moving device is a robotic arm.

* * * * *